(12) United States Patent
Soundararajan et al.

(10) Patent No.: US 10,579,414 B2
(45) Date of Patent: Mar. 3, 2020

(54) MISPREDICTION-TRIGGERED LOCAL HISTORY-BASED BRANCH PREDICTION

(71) Applicant: Intel Corporation, Santa Clara, CA (US)

(72) Inventors: Niranjan K. Soundararajan, Bangalore (IN); Saurabh Gupta, Tacoma, WA (US); Sreenivas Subramoney, Bangalore (IN); Rahul Pal, Bangalore (IN); Ragavendra Natarajan, Mysore (IN); Daniel Deng, Santa Clara, CA (US); Jared W. Stark, Portland, OR (US); Ronak Singhal, Portland, OR (US); Hong Wang, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 60 days.

(21) Appl. No.: 15/477,064

(22) Filed: Apr. 1, 2017

(65) Prior Publication Data
US 2018/0285115 A1    Oct. 4, 2018

(51) Int. Cl.
*G06F 9/38*     (2018.01)
*G06F 9/46*     (2006.01)

(52) U.S. Cl.
CPC .............. *G06F 9/46* (2013.01); *G06F 9/3848* (2013.01)

(58) Field of Classification Search
CPC .................................................... G06F 9/3844
See application file for complete search history.

(56) References Cited

U.S. PATENT DOCUMENTS

| 5,687,360 | A | * | 11/1997 | Chang | .................. | G06F 9/3848 |
|---|---|---|---|---|---|---|
| | | | | | | 712/240 |
| 5,860,017 | A | * | 1/1999 | Sharangpani | ......... | G06F 9/3804 |
| | | | | | | 712/218 |
| 7,219,217 | B1 | * | 5/2007 | Baweja | ................. | G06F 9/3848 |
| | | | | | | 712/239 |
| 2015/0052338 | A1 | * | 2/2015 | Kuwahara | ............. | G06F 9/3806 |
| | | | | | | 712/240 |
| 2015/0363204 | A1 | * | 12/2015 | Bonanno | ............... | G06F 9/3806 |
| | | | | | | 712/240 |

* cited by examiner

*Primary Examiner* — Michael J Metzger
(74) *Attorney, Agent, or Firm* — Nicholson De Vos Webster & Elliot LLP (57) ABSTRACT

Embodiments of apparatuses, methods, and systems for misprediction-triggered local history-based branch prediction are described. In one embodiments, an apparatus includes a current pattern table and a local pattern table. The current pattern table has a plurality of entries, each entry in which to store a plurality of pattern lengths of a current pattern of one of a plurality of branch instructions. The local pattern table is to provide a first branch prediction based on the current pattern.

18 Claims, 9 Drawing Sheets

FIG. 1
BRANCH PREDICTOR 100

FIG. 2
METHOD 200

FIG. 3
METHOD 300

MISPREDICTION-TRIGGERED LOCAL HISTORY-BASED BRANCH PREDICTION

FIELD OF INVENTION

The field of invention relates generally to computer architecture, and, more specifically, to branch prediction.

BACKGROUND

The processing devices within many computers and other information processing systems includes branch prediction hardware. Branch prediction is useful to improve performance in a pipelined processor because it allows for the pipeline to continue to be filled as instructions following the branch are speculatively executed. Mispredictions are typically handled by flushing the pipeline, so increasing the accuracy of branch prediction typically increases the performance of a processor.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In the following description, numerous specific details are set forth. However, it is understood that embodiments of the invention may be practiced without these specific details. In other instances, well-known circuits, structures, and techniques have not been shown in detail in order not to obscure the understanding of this description.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described.

As pipeline depth and width increases in processor architectures, increasing the branch prediction rate has a greater impact on performance. Therefore, embodiments of the invention that may improve the branch prediction rate may be increasingly desirable. Embodiments of the invention may improve the branch prediction rate by capturing patterns of arbitrary lengths that might not be captured by a local history-based predictor using one or more fixed pattern lengths. Embodiments of the invention may also or instead improve the branch prediction rate by capturing patterns only in response to a misprediction by a global history-based or other type of predictor, thus providing the potential for the use of the more accurate of two different prediction approaches for every individual prediction.

Figure 1:
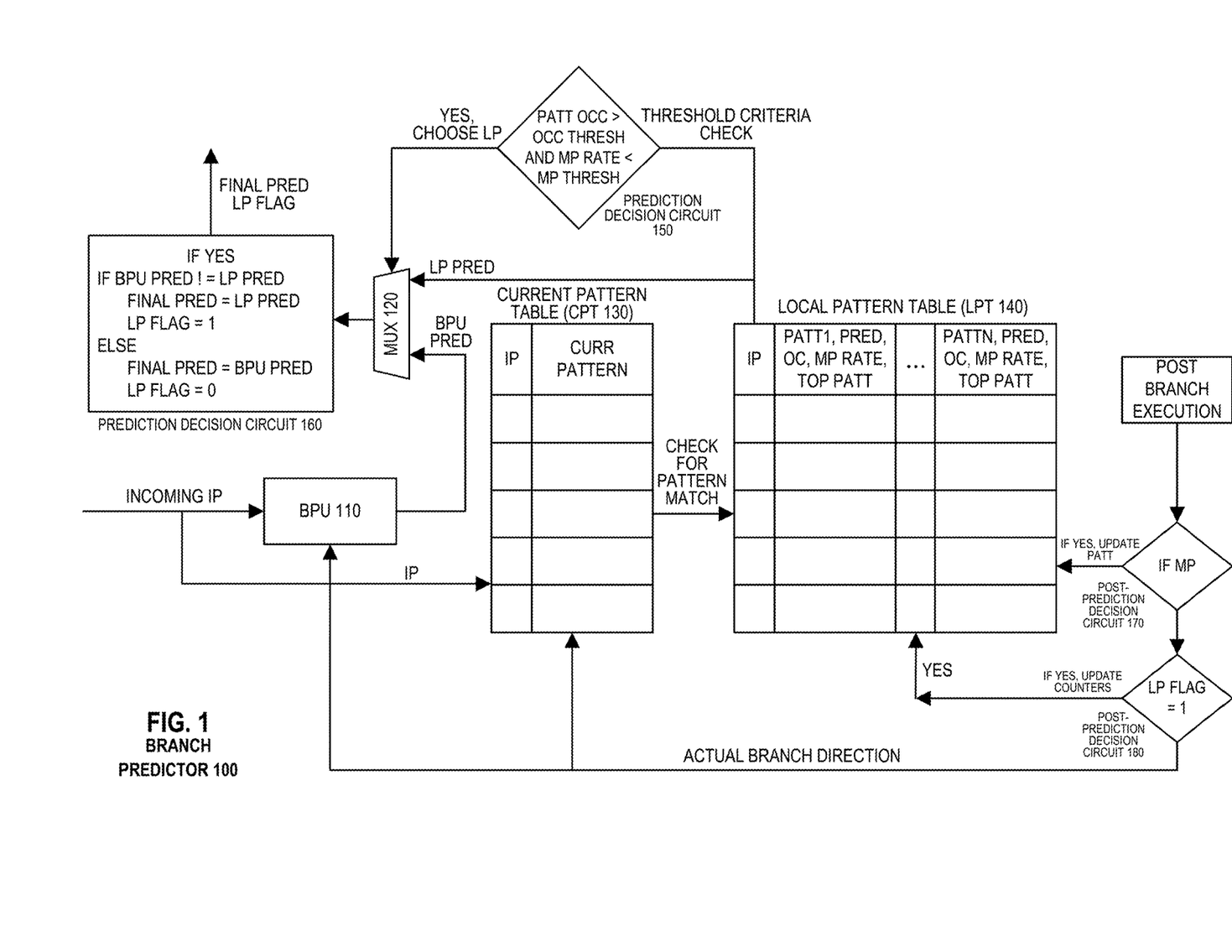
FIG. 1 is a block diagram illustrating a branch predictor according to an embodiment of the invention.

FIG. 1 is a block diagram illustrating a branch predictor according to an embodiment of the invention. As shown in FIG. 1, branch predictor 100 may be implemented in logic gates, storage elements, and any other type of circuitry, and may be integrated into the circuitry of a processing device or any other apparatus in a computer or other information processing system. Accordingly, processors and systems such as those illustrated in FIGS. 4 through 9 may include embodiments of the invention.

Branch predictor 100 includes branch prediction unit (BPU) 110, multiplexor 120, current pattern table (CPT) 130, local pattern table (LPT) 140, prediction decision circuits 150 and 160, and post-prediction decision circuits 170 and 180. BPU 110 may be any known branch predictor, such as a global history-based predictor. For purposes of this description, the output of BPU 110 and/or the result of the operation of BPU 110 may be referred to as a BPU prediction or a global prediction, but embodiments of the invention are not limited to those in which BPU 110 is a global history-based predictor. Each of CPT 130 and LPT 140 may be tables implemented according to any known approach, each having any desired number of entries. Each of decision circuits 150, 160, 170, and 180 may be implemented using any desired combination of known logic gates and/or circuits, such as AND gates, OR gates, exclusive OR gates, comparators, etc.

As shown in FIG. 1, each branch instruction, represented by its program counter address or instruction pointer (IP), is routed (e.g., from a program counter) to BPU 110 and CPT 130. BPU 110 uses the incoming IP to make a global prediction. The output of BPU 110 is coupled to a first input of multiplexor 120 such that BPU predictions may be routed to multiplexor 120.

The incoming IP is also used as an index or other input into CPT 130, in which each entry includes an IP field (IP) and a current pattern field (Curr Pattern) to track a current pattern per IP. In an embodiment, a counter and a flag may be associated with each CPT entry. The counter may keep a running count of the pattern length and the flag may indicate a terminating condition. Thus, the current pattern field may be used to store a count and a flag, tracking patterns of arbitrary length, up to the maximum value of the counter.

For example, execution of a conditional branch instruction, such as that associated with a loop or an if-then-else statement, may result in a pattern of any number of consecutive repetitions of a certain direction followed by pattern termination when the direction changes. More specifically, using 'T' to indicate that the branch is taken and 'N' to represent that the branch is not taken, a loop may be represented by a pattern such as TTN, TTTN, TTTTN, or any number of Ts followed by N, and an if-then-else statement may be represented by a pattern such as TTN, TTTN, TTTTN, or any number of Ts followed by N, or by a pattern such as NNT, NNNT, NNNNT, or any number of Ns followed by T, depending on whether the 'then' or the 'else' path is more often taken.

A pattern may be terminated in response to the branch direction flipping from T to N or from N to T; therefore, such flips may be referred to as terminating conditions and the flags associated with CPT entries may be referred to as flip flags. Therefore, the hardware associated with the CPT, the operation of which may occur after the actual branch direction (e.g., T or N) has been determined and may be further described in connection with FIG. 3, may initiate the tracking of a current pattern for a branch instruction with an IP that is not associated with a CPT entry by incrementing (and/or resetting, if resetting is not performed in response to termination) the associated counter and setting the associated flip flag to represent the complement of the actual branch direction. Then, the counter may be incremented each time the branch is executed with an actual branch direction not matching the flip flag. Finally, in response to the actual branch direction matching the flip flag, the current pattern may be terminated, which may include clearing or otherwise releasing the corresponding CPT entry.

CPT 130 is coupled to LPT 140 entry such that the contents of a CPT entry may be routed to the LPT to check whether a current pattern matches a pattern in the LPT. As may be further described in connection with FIG. 3, this checking may be performed in response to a logical AND of pattern termination based on the flip flag and a misprediction by the BPU, such that the LPT is updated only when the BPU mispredicts, thus providing for lowering the overall cost in area, power, and performance of the local history-based feature of embodiments of the invention.

Each entry in LPT 140 may include an IP field and any number of pattern fields to support tracking multiple patterns per IP. Each pattern field may include a number of subfields, including a pattern number subfield (Patt1 to PattN) in which to store a number to label the pattern, a final prediction subfield (Pred) in which to store the final prediction for the pattern, an occurrence count subfield (OC) in which to store a count of the occurrences of the pattern, a misprediction rate subfield (MP rate) in which to store a misprediction rate or other measure of the frequency of misprediction resulting from basing a prediction on the pattern, and a top pattern flag subfield (top pattern) in which to store an indication of whether the pattern is to be considered a top pattern for the corresponding IP. In various embodiments, the criteria for determining whether a pattern is to be flagged as a top pattern may vary based on any desired factors and levels of those factors; for example, a pattern may be chosen as a top pattern if it has a relatively high occurrence count and a relatively low misprediction rate, where the values corresponding to the terms relatively high and relatively low may be defined statically or dynamically.

LPT 140 is coupled to a second input of multiplexor 120 such that a prediction based on a local pattern, which may be referred to as an LP prediction, may override a BPU prediction. LPT 140 is also coupled to an input of prediction decision circuit 150 to provide for using a threshold criteria check, as described in connection with FIG. 2, to determine whether to override a BPU prediction with an LP prediction. Multiplexor 120 is coupled to an input of prediction decision circuit 160 to provide for setting a flag (LP flag) to indicate whether an LP prediction overrode a BPU prediction, also as described in connection with FIG. 2.

LPT 140 is also coupled to an input of post-prediction decision circuit 170, an output of which is coupled to post-prediction decision circuit 180, to provide for post-prediction updating of BPU 120, CPT 130, and LPT 140 as described in connection with FIG. 3. At least one other input of post-prediction decision circuit 170 is coupled to receive information, following the execution of the branch instructions, to indicate or with which to determine whether the branch predictions were accurate. Though not shown in FIG. 1, another input of post-prediction decision circuit 180 is coupled to an output of prediction decision circuit 160 to receive the LP flag.

Figure 2:
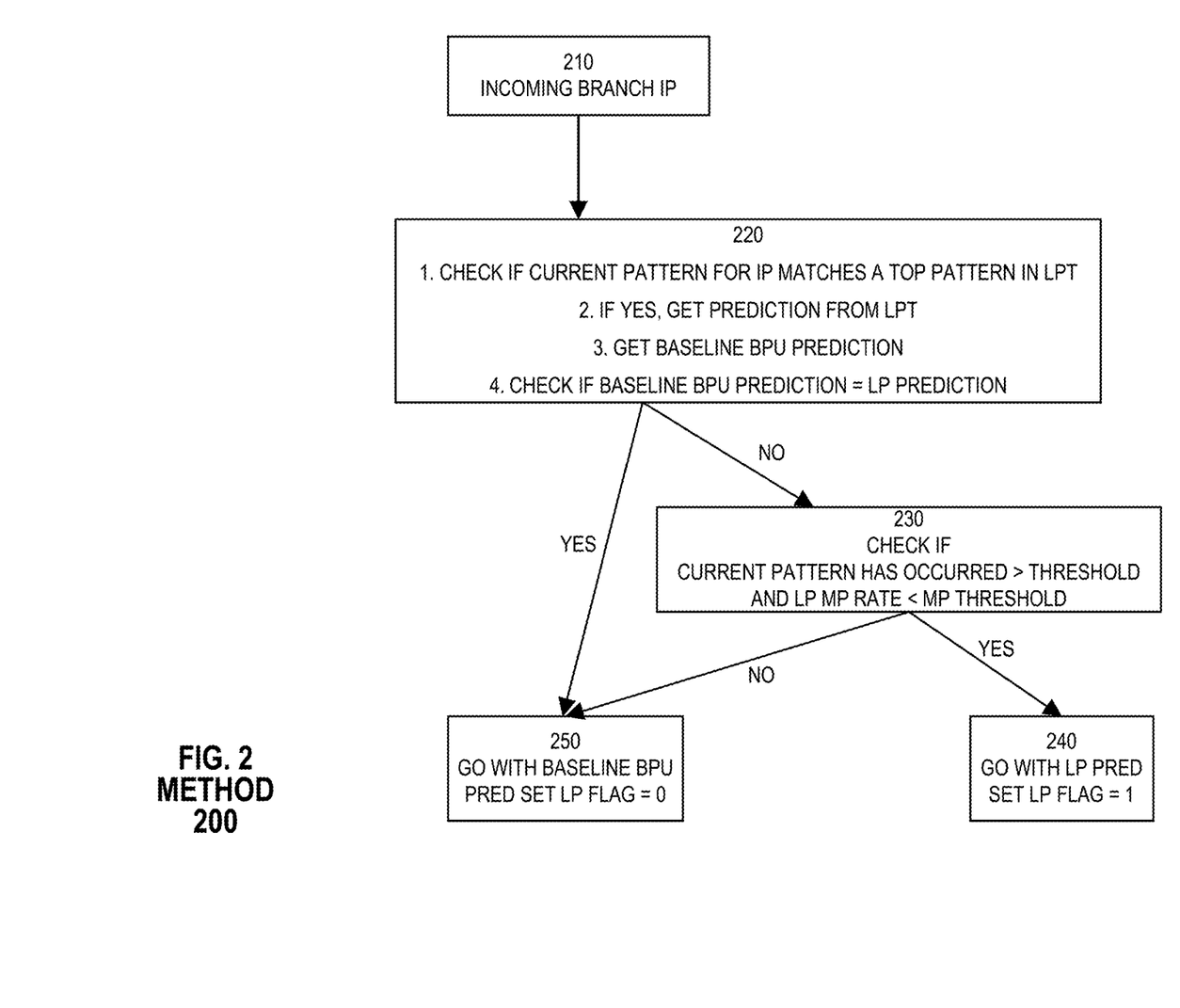
FIG. 2 is a flow diagram illustrating a method for branch prediction according to an embodiment of the invention.

FIG. 2 is a flow diagram illustrating a method for branch prediction according to an embodiment of the invention. In block 210 of method 200, an IP of a branch instruction is received by branch predictor 100.

In block 220, an entry for the IP (if one exists) is found in CPT 130, and, if the current pattern for that IP exists and is flagged as a top pattern in LPT 140, the LP prediction from LPT 140 is compared to the BPU prediction. If the LP prediction matches the BPU prediction, method 200 continues in block 250. If not, method 200 continues in block 230.

In block 230, prediction decision circuit 150 determines whether the current pattern passes a threshold criteria check. In an embodiment, the current pattern passes the threshold criteria check if both of two conditions are met, where the first condition is that the value from the LPT's OC subfield for the current pattern is greater than a predetermined occurrence threshold, and the second condition is that the value from the LPT's MP rate subfield is less than a predetermined misprediction threshold. If the threshold criteria check passes, method 200 continues in block 240. If not, method 200 continues in block 250.

In block 240, the LP prediction overrides the BPU prediction, for example, by multiplexor 120 selecting the LP prediction input instead of the BPU prediction input, and the LP flag is set, for example, by prediction decision circuit 160, to indicate to post-prediction decision circuit 180 that the LP prediction was used instead of the BPU prediction.

In block 250, the BPU prediction is used instead of the LP prediction, and the LP flag is cleared, for example, by prediction decision circuit 160.

Figure 3:
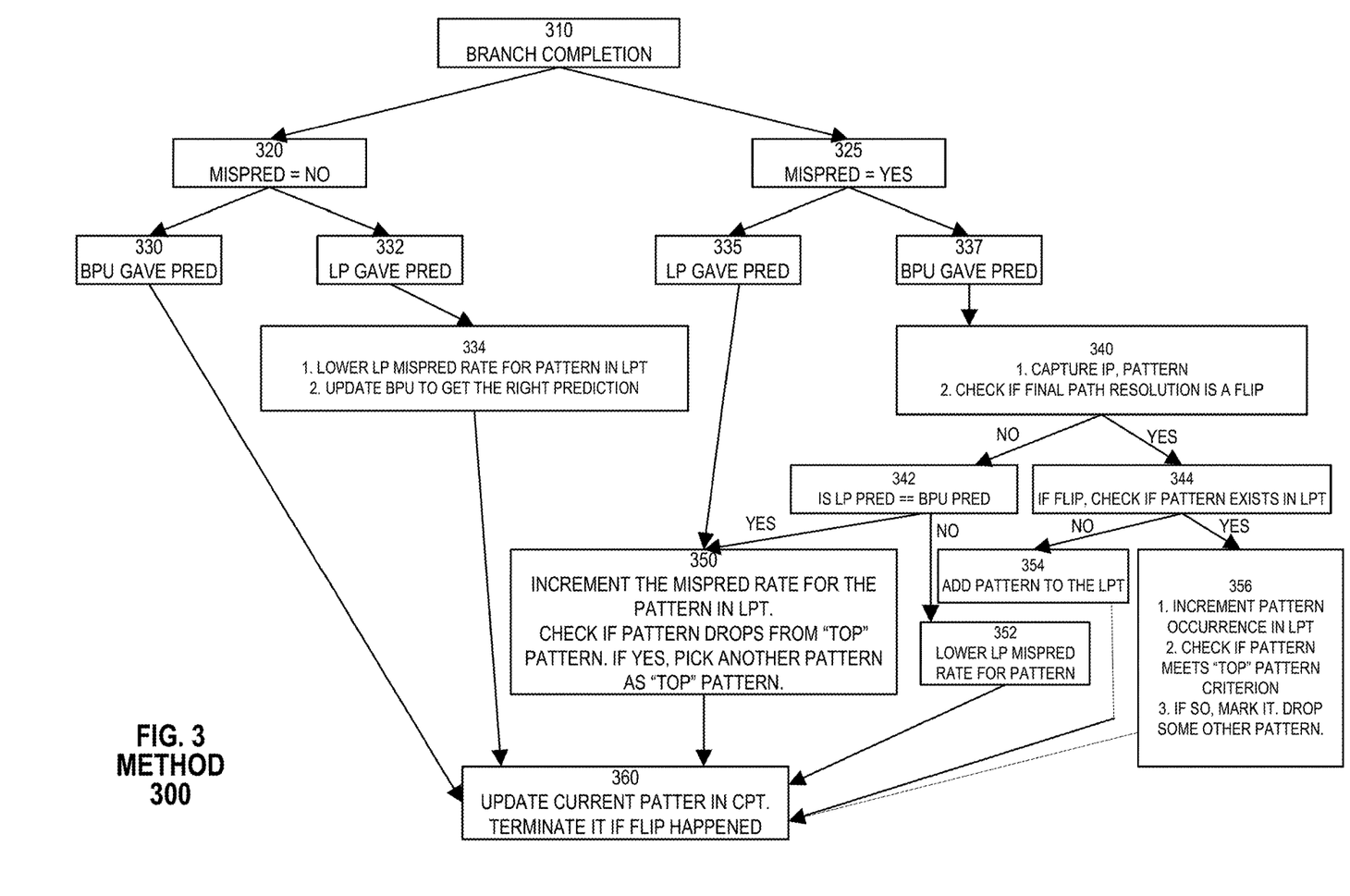
FIG. 3 is a flow diagram illustrating a method for post-prediction updating of a branch predictor according to an embodiment of the invention.

FIG. 3 is a flow diagram illustrating a method for post-prediction updating of a branch predictor according to an embodiment of the invention. In block 310 of method 300, after resolution of the direction of a branch instruction is completed, for example by execution of the branch instruction by a jump execution unit, post-prediction decision block 170 determines whether a corresponding branch prediction was accurate. If the branch prediction was accurate, method 300 continues in block 320. If not, method 300 continues in block 325.

In block 320, post-prediction decision block 180 determines, for example based on the LP flag, whether the prediction was from the BPU or the LPT. If from the BPU, method 300 continues in block 330 and then block 360; if from the LPT, method 300 continues in block 332 and then block 334. In block 334, the LPT is updated by lowering (e.g., decrementing) the MP rate for the pattern on which the LP prediction was based, and the BPU may be updated according to whatever prediction approach it uses. From block 334, method 300 continues in block 360.

In block 325, post-prediction decision block 180 determines, for example based on the LP flag, whether the prediction was from the BPU or the LPT. If from the LPT, method 300 continues in block 335 and then block 350; if from the BPU, method 300 continues in block 337 and then block 340.

In block 340, the IP is found in or added to the CPT and the current pattern field of the corresponding CPT entry is updated based on the prediction (e.g., T or N). If updating the pattern indicates that a flip has occurred, method 300 continues in block 344. If not, method 300 continues in block 342.

In block 342, it is determined whether the LP prediction matches the BPU prediction. If so, method 300 continues in block 350. If not, method 300 continues in block 352.

In block 344, it is determined whether the pattern on which the LP prediction was based is present in the LPT. If not, method 300 continues in block 354. If so, method 300 continues in block 356.

In block 350, the LPT is updated by increasing (e.g., incrementing) the MP rate for the pattern on which the LP prediction was based. If increasing the MP rate for that pattern causes it to be dropped from being a top pattern, a different pattern may be chosen to be a top pattern. From block 350, method 300 continues in block 360.

In block 352, the LPT is updated by decreasing (e.g., decrementing) the MP rate for the pattern on which the LP prediction was based. From block 352, method 300 continues in block 360.

In block 354, the LPT is updated by adding the pattern on which the LP prediction was based. From block 354, method 300 continues in block 360.

In block 356, the LPT is updated by increasing (e.g., incrementing) the OC value for the pattern on which the LP prediction was based. If increasing the OC value for that pattern causes it to meet the criterion for being a top pattern, the corresponding top pattern flag may be set and a different pattern may be dropped a top pattern. From block 356, method 300 continues in block 360.

In block 360, the CPT is updated with the current pattern. If updating the pattern indicates that a flip has occurred, the current pattern is terminated.

Exemplary Core Architectures, Processors, and Computer Architectures

The figures below detail exemplary architectures and systems to implement embodiments of the above.

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

Figure 4A:
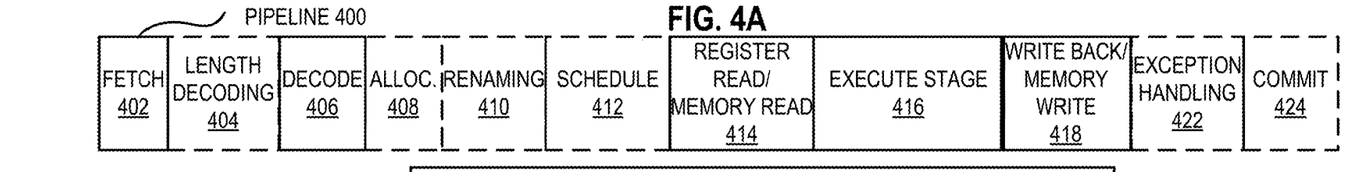
FIG. 4A is a block diagram illustrating both an exemplary in-order pipeline and an exemplary register renaming, out-of-order issue/execution pipeline according to embodiments of the invention.
Figure 4B:
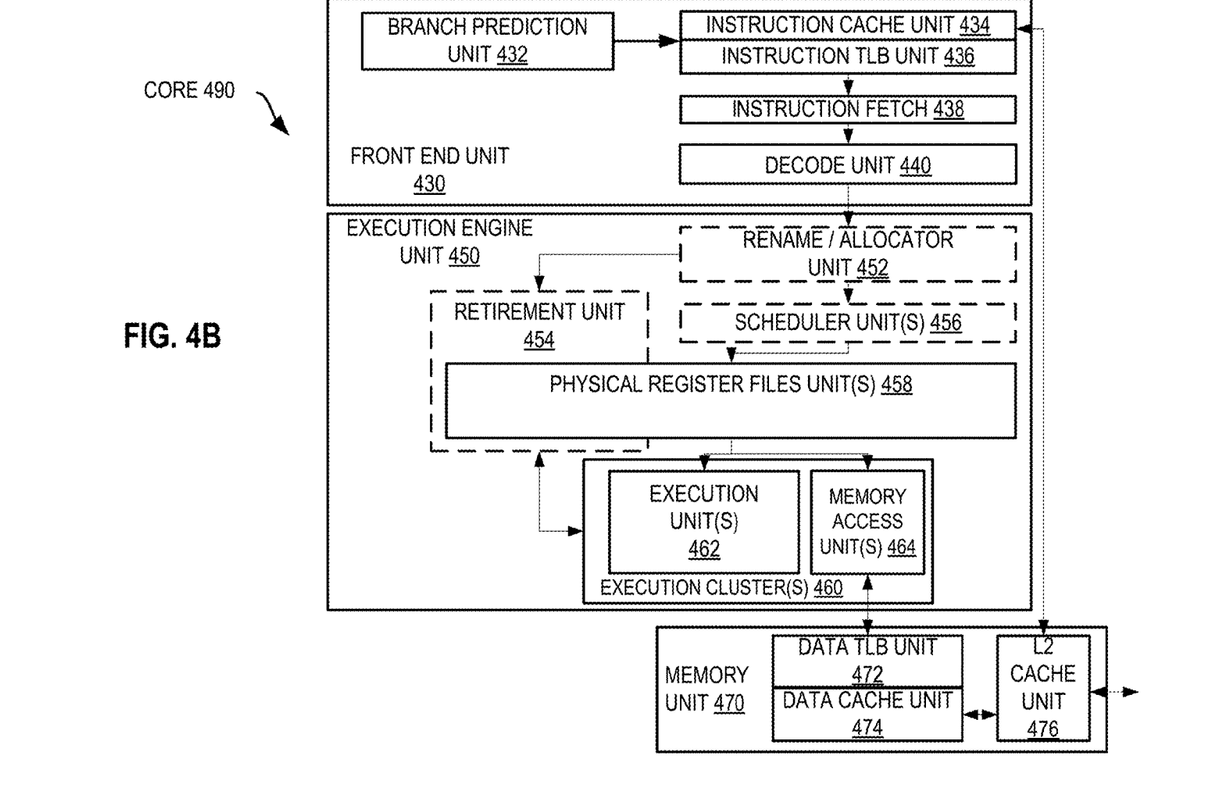
FIG. 4B is a block diagram illustrating both an exemplary embodiment of an in-order architecture core and an exemplary register renaming, out-of-order issue/execution architecture core to be included in a processor according to embodiments of the invention.

FIG. 4A is a block diagram illustrating both an exemplary in-order pipeline and an exemplary register renaming, out-of-order issue/execution pipeline according to embodiments of the invention. FIG. 4B is a block diagram illustrating both an exemplary embodiment of an in-order architecture core and an exemplary register renaming, out-of-order issue/execution architecture core to be included in a processor according to embodiments of the invention. The solid lined boxes in FIGS. 4A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 4A, a processor pipeline 400 includes a fetch stage 402, a length decode stage 404, a decode stage 406, an allocation stage 408, a renaming stage 410, a scheduling (also known as a dispatch or issue) stage 412, a register read/memory read stage 414, an execute stage 416, a write back/memory write stage 418, an exception handling stage 422, and a commit stage 424.

FIG. 4B shows processor core 490 including a front end unit 430 coupled to an execution engine unit 450, and both are coupled to a memory unit 470. The core 490 may be a reduced instruction set computing (RISC) core, a complex instruction set computing (CISC) core, a very long instruction word (VLIW) core, or a hybrid or alternative core type. As yet another option, the core 490 may be a special-purpose core, such as, for example, a network or communication core, compression engine, coprocessor core, general purpose computing graphics processing unit (GPGPU) core, graphics core, or the like.

The front end unit 430 includes a branch prediction unit 432, which represents a branch prediction unit or branch predictor according to an embodiment of the present invention, such as branch predictor 100 of FIG. 1.

Branch prediction unit 432 is coupled to an instruction cache unit 434, which is coupled to an instruction translation lookaside buffer (TLB) 436, which is coupled to an instruction fetch unit 438, which is coupled to a decode unit 440. The decode unit 440 (or decoder) may decode instructions, and generate as an output one or more micro-operations, micro-code entry points, microinstructions, other instructions, or other control signals, which are decoded from, or which otherwise reflect, or are derived from, the original instructions. The decode unit 440 may be implemented using various different mechanisms. Examples of suitable mechanisms include, but are not limited to, look-up tables, hardware implementations, programmable logic arrays (PLAs), microcode read only memories (ROMs), etc. In one embodiment, the core 490 includes a microcode ROM or other medium that stores microcode for certain macroinstructions (e.g., in decode unit 440 or otherwise within the front end unit 430). The decode unit 440 is coupled to a rename/allocator unit 452 in the execution engine unit 450.

The execution engine unit 450 includes the rename/allocator unit 452 coupled to a retirement unit 454 and a set of one or more scheduler unit(s) 456. The scheduler unit(s) 456 represents any number of different schedulers, including reservations stations, central instruction window, etc. The scheduler unit(s) 456 is coupled to the physical register file(s) unit(s) 458. Each of the physical register file(s) units 458 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 458 comprises a vector registers unit, a write mask registers unit, and a scalar registers unit. These register units may provide architectural vector registers, vector mask registers, and general purpose registers. The physical register file(s) unit(s) 458 is overlapped by the retirement unit 454 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 454 and the physical register file(s) unit(s) 458 are coupled to the execution cluster(s) 460. The execution cluster(s) 460 includes a set of one or more execution units 462 and a set of one or more memory access units 464. The execution units 462 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 456, physical register file(s) unit(s) 458, and execution cluster(s) 460 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 464). It should also be understood that where separate pipelines are used, one or more of these pipelines may be out-of-order issue/execution and the rest in-order.

The set of memory access units 464 is coupled to the memory unit 470, which includes a data TLB unit 472 coupled to a data cache unit 474 coupled to a level 2 (L2) cache unit 476. In one exemplary embodiment, the memory access units 464 may include a load unit, a store address unit, and a store data unit, each of which is coupled to the data TLB unit 472 in the memory unit 470. The instruction cache unit 434 is further coupled to a level 2 (L2) cache unit 476 in the memory unit 470. The L2 cache unit 476 is coupled to one or more other levels of cache and eventually to a main memory.

By way of example, the exemplary register renaming, out-of-order issue/execution core architecture may implement the pipeline 400 as follows: 1) the instruction fetch 438 performs the fetch and length decoding stages 402 and 404; 2) the decode unit 440 performs the decode stage 406; 3) the rename/allocator unit 452 performs the allocation stage 408 and renaming stage 410; 4) the scheduler unit(s) 456 performs the schedule stage 412; 5) the physical register file(s) unit(s) 458 and the memory unit 470 perform the register read/memory read stage 414; the execution cluster 460 perform the execute stage 416; 6) the memory unit 470 and the physical register file(s) unit(s) 458 perform the write back/memory write stage 418; 7) various units may be involved in the exception handling stage 422; and 8) the retirement unit 454 and the physical register file(s) unit(s) 458 perform the commit stage 424.

The core 490 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 490 includes logic to support a packed data instruction set extension (e.g., AVX1, AVX2), thereby allowing the operations used by many multimedia applications to be performed using packed data.

It should be understood that the core may support multi-threading (executing two or more parallel sets of operations or threads), and may do so in a variety of ways including time sliced multithreading, simultaneous multithreading (where a single physical core provides a logical core for each of the threads that physical core is simultaneously multi-threading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 434/474 and a shared L2 cache unit 476, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Figure 5:
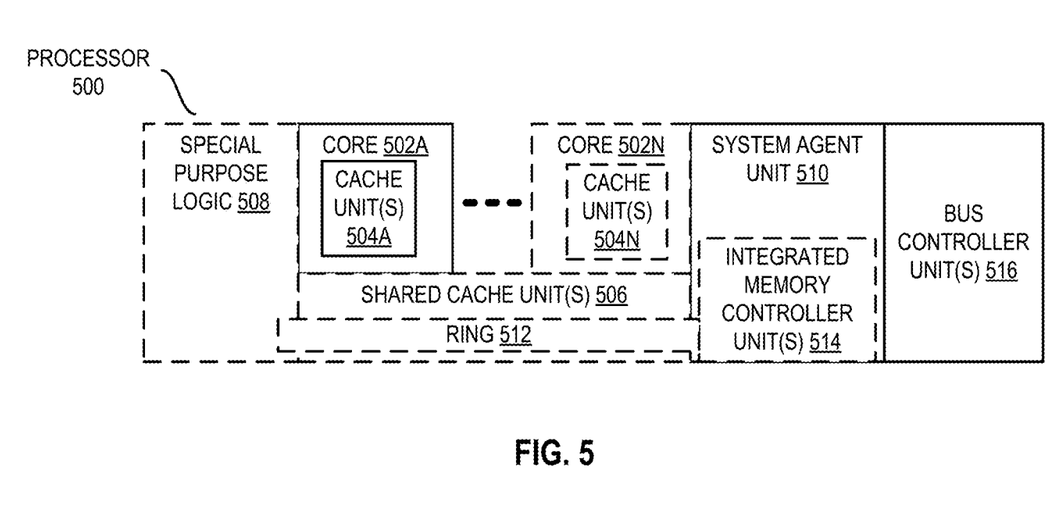
FIG. 5 is a block diagram of a processor 500 that may have more than one core, may have an integrated memory controller, and may have integrated graphics according to embodiments of the invention.

FIG. 5 is a block diagram of a processor 500 that may have more than one core, may have an integrated memory controller, and may have integrated graphics according to embodiments of the invention. The solid lined boxes in FIG. 5 illustrate a processor 500 with a single core 502A, a system agent 510, a set of one or more bus controller units 516, while the optional addition of the dashed lined boxes illustrates an alternative processor 500 with multiple cores 502A-N, a set of one or more integrated memory controller unit(s) 514 in the system agent unit 510, and special purpose logic 508.

Thus, different implementations of the processor 500 may include: 1) a CPU with the special purpose logic 508 being integrated graphics and/or scientific (throughput) logic (which may include one or more cores), and the cores 502A-N being one or more general purpose cores (e.g., general purpose in-order cores, general purpose out-of-order cores, a combination of the two); 2) a coprocessor with the cores 502A-N being a large number of special purpose cores intended primarily for graphics and/or scientific (throughput); and 3) a coprocessor with the cores 502A-N being a large number of general purpose in-order cores. Thus, the processor 500 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 500 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 506, and external memory (not shown) coupled to the set of integrated memory controller units 514. The set of shared cache units 506 may include one or more mid-level caches, such as level 2 (L2), level 3 (L3), level 4 (L4), or other levels of cache, a last level cache (LLC), and/or combinations thereof. While in one embodiment a ring based interconnect unit 512 interconnects the integrated graphics logic 508 (integrated graphics logic 508 is an example of and is also referred to herein as special purpose logic), the set of shared cache units 506, and the system agent unit 510/integrated memory controller unit(s) 514, alternative embodiments may use any number of well-known techniques for interconnecting such units. In one embodiment, coherency is maintained between one or more cache units 506 and cores 502-A-N.

In some embodiments, one or more of the cores 502A-N are capable of multithreading. The system agent 510 includes those components coordinating and operating cores 502A-N. The system agent unit 510 may include for example a power control unit (PCU) and a display unit. The PCU may be or include logic and components needed for regulating the power state of the cores 502A-N and the integrated graphics logic 508. The display unit is for driving one or more externally connected displays.

The cores 502A-N may be homogenous or heterogeneous in terms of architecture instruction set; that is, two or more of the cores 502A-N may be capable of execution the same instruction set, while others may be capable of executing only a subset of that instruction set or a different instruction set.

Exemplary Computer Architectures

FIGS. 6-9 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 6:
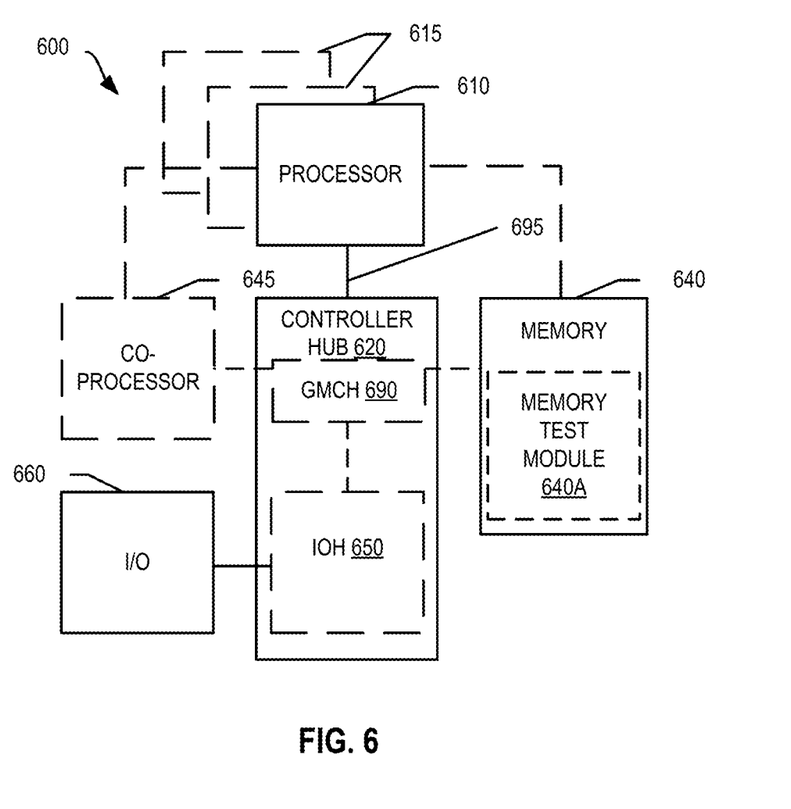
FIG. 6 is a block diagram of a system in accordance with one embodiment of the present invention.

Referring now to FIG. 6, shown is a block diagram of a system 600 in accordance with one embodiment of the present invention. The system 600 may include one or more processors 610, 615, which are coupled to a controller hub 620. In one embodiment, the controller hub 620 includes a graphics memory controller hub (GMCH) 690 and an Input/Output Hub (IOH) 650 (which may be on separate chips); the GMCH 690 includes memory and graphics controllers to which are coupled memory 640 and a coprocessor 645; the IOH 650 couples input/output (I/O) devices 660 to the GMCH 690. Alternatively, one or both of the memory and graphics controllers are integrated within the processor (as described herein), the memory 640 and the coprocessor 645 are coupled directly to the processor 610, and the controller hub 620 in a single chip with the IOH 650.

The optional nature of additional processors 615 is denoted in FIG. 6 with broken lines. Each processor 610, 615 may include one or more of the processing cores described herein and may be some version of the processor 500.

The memory 640 may be, for example, dynamic random access memory (DRAM), phase change memory (PCM), or a combination of the two. For at least one embodiment, the controller hub 620 communicates with the processor(s) 610, 615 via a multi-drop bus, such as a frontside bus (FSB), point-to-point interface such as QuickPath Interconnect (QPI), or similar connection 695.

In one embodiment, the coprocessor 645 is a special-purpose processor, such as, for example, a high-throughput MIC processor, a network or communication processor, compression engine, graphics processor, GPGPU, embedded processor, or the like. In one embodiment, controller hub 620 may include an integrated graphics accelerator.

There can be a variety of differences between the physical resources 610, 615 in terms of a spectrum of metrics of merit including architectural, microarchitectural, thermal, power consumption characteristics, and the like.

In one embodiment, the processor 610 executes instructions that control data processing operations of a general type. Embedded within the instructions may be coprocessor instructions. The processor 610 recognizes these coprocessor instructions as being of a type that should be executed by the attached coprocessor 645. Accordingly, the processor 610 issues these coprocessor instructions (or control signals representing coprocessor instructions) on a coprocessor bus or other interconnect, to coprocessor 645. Coprocessor(s) 645 accept and execute the received coprocessor instructions.

Figure 7:
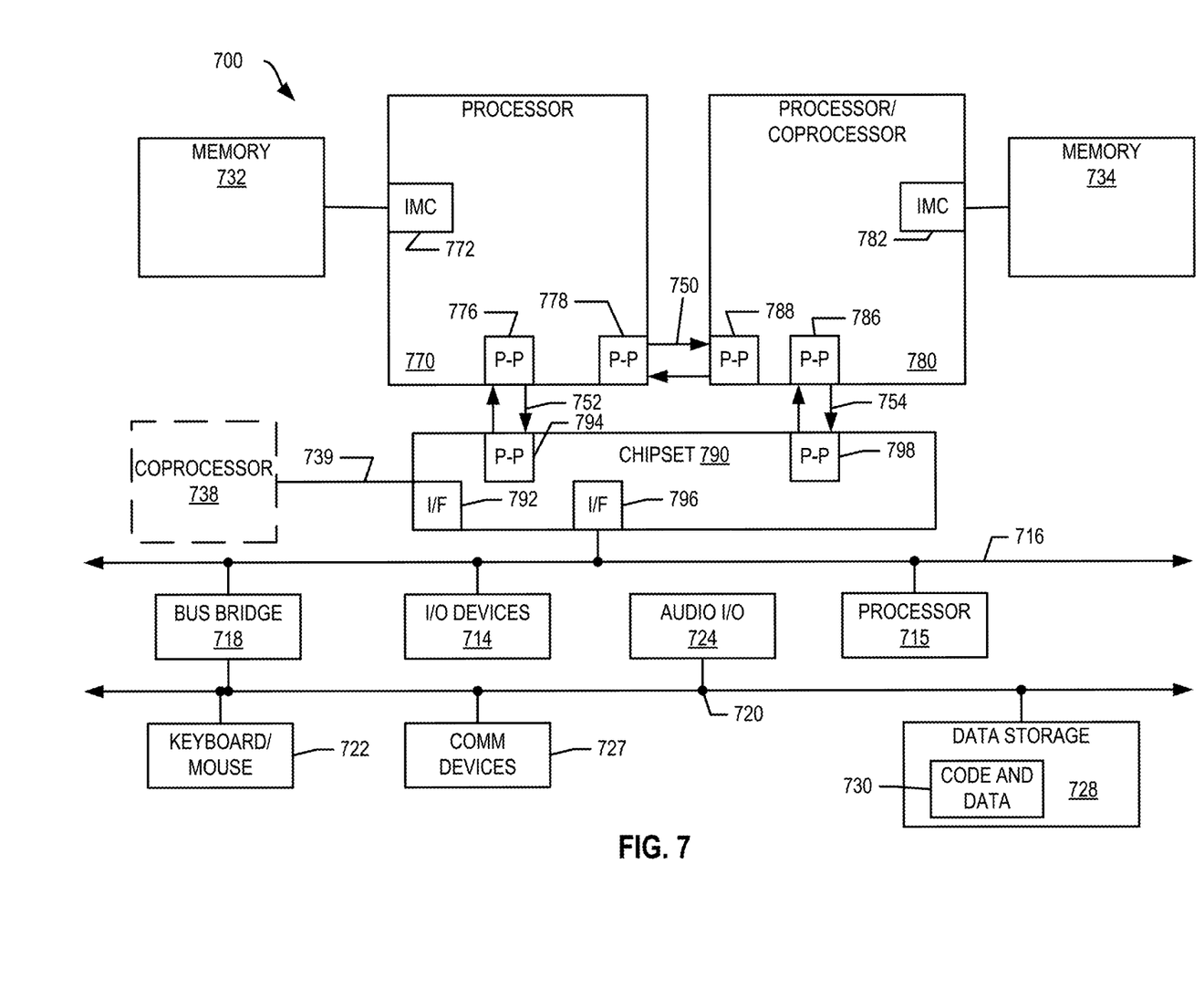
FIG. 7 is a block diagram of a first more specific exemplary system in accordance with an embodiment of the present invention.

Referring now to FIG. 7, shown is a block diagram of a first more specific exemplary system 700 in accordance with an embodiment of the present invention. As shown in FIG. 7, multiprocessor system 700 is a point-to-point interconnect system, and includes a first processor 770 and a second processor 780 coupled via a point-to-point interconnect 750. Each of processors 770 and 780 may be some version of the processor 500. In one embodiment of the invention, processors 770 and 780 are respectively processors 610 and 615, while coprocessor 738 is coprocessor 645. In another embodiment, processors 770 and 780 are respectively processor 610 coprocessor 645.

Processors 770 and 780 are shown including integrated memory controller (IMC) units 772 and 782, respectively. Processor 770 also includes as part of its bus controller units point-to-point (P-P) interfaces 776 and 778; similarly, second processor 780 includes P-P interfaces 786 and 788. Processors 770, 780 may exchange information via a point-to-point (P-P) interface 750 using P-P interface circuits 778, 788. As shown in FIG. 7, IMCs 772 and 782 couple the processors to respective memories, namely a memory 732 and a memory 734, which may be portions of main memory locally attached to the respective processors.

Processors 770, 780 may each exchange information with a chipset 790 via individual P-P interfaces 752, 754 using point to point interface circuits 776, 794, 786, 798. Chipset 790 may optionally exchange information with the coprocessor 738 via a high-performance interface 792. In one embodiment, the coprocessor 738 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 790 may be coupled to a first bus 716 via an interface 796. In one embodiment, first bus 716 may be a Peripheral Component Interconnect (PCI) bus, or a bus such as a PCI Express bus or another third generation I/O interconnect bus, although the scope of the present invention is not so limited.

As shown in FIG. 7, various I/O devices 714 may be coupled to first bus 716, along with a bus bridge 718 which couples first bus 716 to a second bus 720. In one embodiment, one or more additional processor(s) 715, such as coprocessors, high-throughput MIC processors, GPGPU's, accelerators (such as, e.g., graphics accelerators or digital signal processing (DSP) units), field programmable gate arrays, or any other processor, are coupled to first bus 716. In one embodiment, second bus 720 may be a low pin count (LPC) bus. Various devices may be coupled to a second bus 720 including, for example, a keyboard and/or mouse 722, communication devices 727 and a storage unit 728 such as a disk drive or other mass storage device which may include instructions/code and data 730, in one embodiment. Further, an audio I/O 724 may be coupled to the second bus 720. Note that other architectures are possible. For example, instead of the point-to-point architecture of FIG. 7, a system may implement a multi-drop bus or other such architecture.

Figure 8:
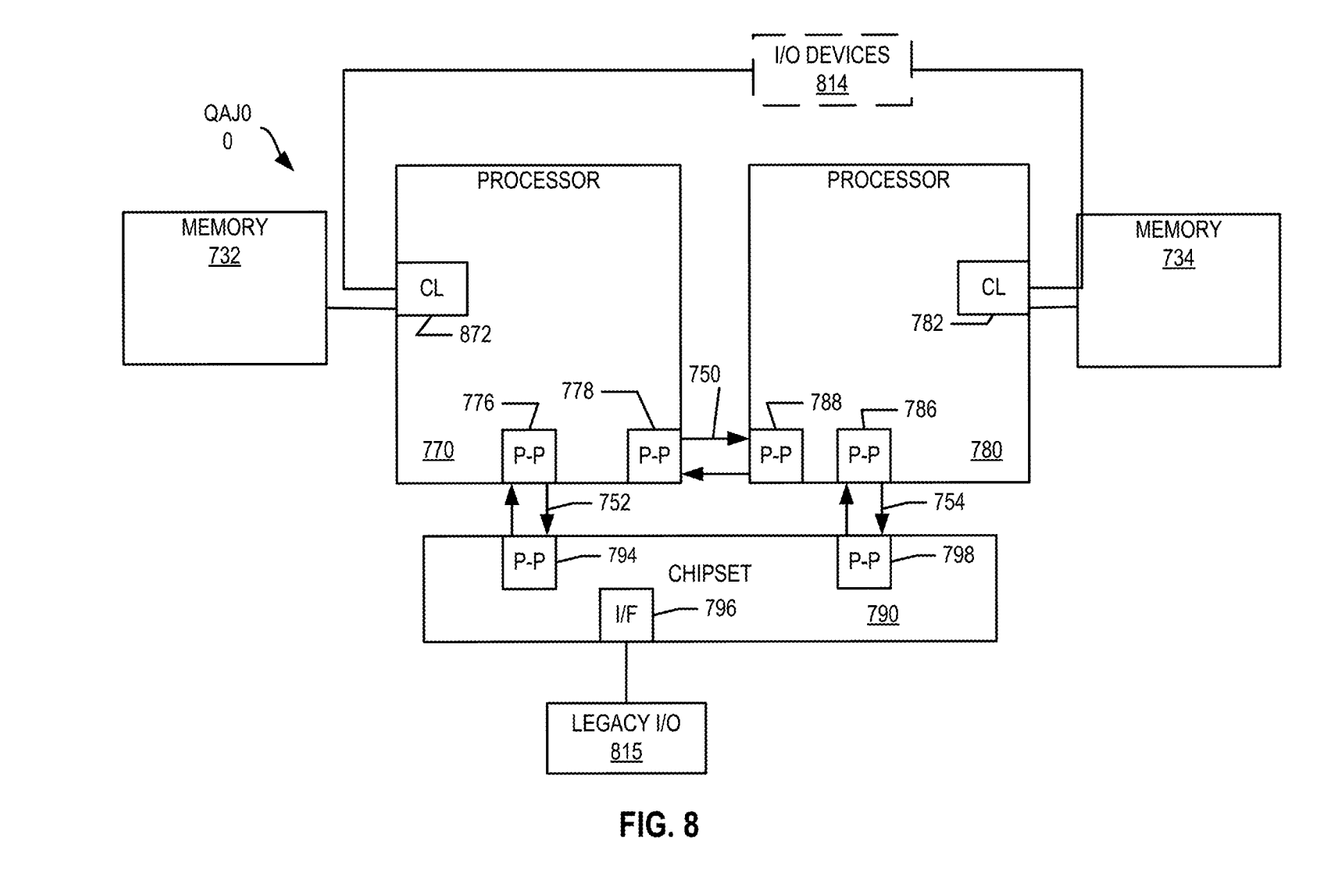
FIG. 8 is a block diagram of a second more specific exemplary system in accordance with an embodiment of the present invention.

Referring now to FIG. 8, shown is a block diagram of a second more specific exemplary system 800 in accordance with an embodiment of the present invention. Like elements in FIGS. 7 and 8 bear like reference numerals, and certain aspects of FIG. 7 have been omitted from FIG. 8 in order to avoid obscuring other aspects of FIG. 8.

FIG. 8 illustrates that the processors 770, 780 may include integrated memory and I/O control logic ("CL") 772 and 782, respectively. Thus, the CL 772, 782 include integrated memory controller units and include I/O control logic. FIG. 8 illustrates that not only are the memories 732, 734 coupled to the CL 772, 782, but also that I/O devices 814 are also coupled to the control logic 772, 782. Legacy I/O devices 815 are coupled to the chipset 790.

Figure 9:
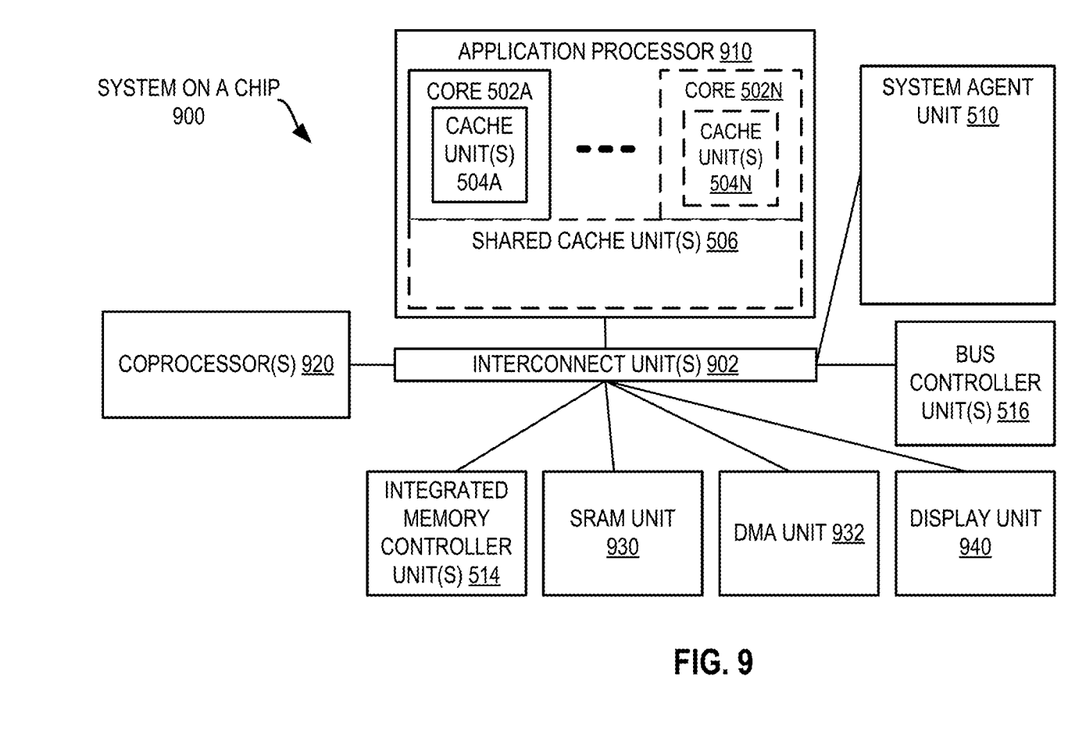
FIG. 9 is a block diagram of a SoC in accordance with an embodiment of the present invention.

Referring now to FIG. 9, shown is a block diagram of a SoC 900 in accordance with an embodiment of the present invention. Similar elements in FIG. 5 bear like reference numerals. Also, dashed lined boxes are optional features on more advanced SoCs. In FIG. 9, an interconnect unit(s) 902 is coupled to: an application processor 910 which includes a set of one or more cores 502A-N, which include cache units 504A-N, and shared cache unit(s) 506; a system agent unit 510; a bus controller unit(s) 516; an integrated memory controller unit(s) 514; a set or one or more coprocessors 920 which may include integrated graphics logic, an image processor, an audio processor, and a video processor; an static random access memory (SRAM) unit 930; a direct memory access (DMA) unit 932; and a display unit 940 for coupling to one or more external displays. In one embodiment, the coprocessor(s) 920 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 730 illustrated in FIG. 7, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMS) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

In an embodiment, an apparatus may include a CPT and an LPT. The CPT has a plurality of CPT entries, each CPT entry in which to store a plurality of pattern lengths of a current pattern of one of a plurality of branch instructions. The LPT is to provide a first branch prediction based on the current pattern. The pattern length may be based, at least in part, on a counter. The pattern length may also be based, at least in part, on a termination condition. The termination condition may be a flip in direction of the corresponding branch instruction. Each CPT entry may include a flip flag to indicate a value for the termination condition. The apparatus may also include a multiplexor to select the first branch prediction to override a second branch prediction. The second branch prediction may be based on a global history. The LPT may have a plurality of LPT entries, each LPT entry including a plurality of pattern fields, each pattern field to store one of a plurality of patterns per branch instruction. Each pattern field may include a final prediction subfield in which to store the first branch prediction for the corresponding pattern. Each pattern field may also include an occurrence count subfield in which to store an occurrence count for the corresponding pattern. The top pattern flag may be based on the occurrence count and the misprediction rate. The first branch prediction may be provided by the LPT only if the corresponding top pattern flag is set. The apparatus may also include a first prediction decision circuit to determine whether the multiplexor is to select the first branch prediction, wherein the first prediction decision circuit is to determine based on the corresponding occurrence count and the corresponding misprediction rate. The apparatus may also include a second prediction decision circuit to set a local pattern flag in response to the multiplexor overriding the second branch prediction with the first branch prediction. The apparatus may also include a first post-prediction decision circuit to determine whether a branch prediction was accurate. The apparatus may also include a second post-prediction decision circuit to use the local pattern flag to determine whether an actual branch direction corresponds to the first branch prediction or the second branch prediction.

In an embodiment, a method may include tracking a local branch pattern in a CPT having a plurality of CPT entries, each CPT entry in which to store a plurality of pattern lengths of a current pattern; and providing a branch prediction from an LPT based on the current pattern. The LPT is to provide a first branch prediction based on the current pattern. The pattern length may be based, at least in part, on a counter. The pattern length may also be based, at least in part, on a termination condition. The termination condition may be a flip in direction of the corresponding branch instruction. Each CPT entry may include a flip flag to indicate a value for the termination condition. The method may also include selecting the first branch prediction to override a second branch prediction. The second branch prediction may be based on a global history. The LPT may have a plurality of LPT entries, each LPT entry including a plurality of pattern fields, each pattern field to store one of a plurality of patterns per branch instruction. Each pattern field may include a final prediction subfield in which to store the first branch prediction for the corresponding pattern. Each pattern field may also include an occurrence count subfield in which to store an occurrence count for the corresponding pattern. The top pattern flag may be based on the occurrence count and the misprediction rate. The first branch prediction may be provided by the LPT only if the corresponding top pattern flag is set. The method may also include determining whether to select the first branch prediction, wherein the determination is based on the corresponding occurrence count and the corresponding misprediction rate. The method may also include setting a local pattern flag in response to overriding the second branch prediction with the first branch prediction. The method may also include determining whether a branch prediction was accurate. The method may also include using the local pattern flag to determine whether an actual branch direction corresponds to the first branch prediction or the second branch prediction.

In an embodiment, an apparatus may include means for performing any of the methods described above. In an embodiment, a machine-readable tangible medium may store instructions, which, when executed by a machine, cause the machine to perform any of the methods described above.

In an embodiment, a system may include a memory in which to store a plurality of instruction traces, each instruction trace including a plurality of branch instructions; a processor including a branch predictor, the branch predictor including a current pattern table (CPT) having a plurality of CPT entries, each CPT entry in which to store a plurality of pattern lengths of a current pattern of one of the plurality of branch instructions; and a local pattern table (LPT) to provide a first branch prediction based on the current pattern. The LPT is to provide a first branch prediction based on the current pattern. The pattern length may be based, at least in part, on a counter. The pattern length may also be based, at least in part, on a termination condition. The termination condition may be a flip in direction of the corresponding branch instruction. Each CPT entry may include a flip flag to indicate a value for the termination condition. The processor may also include a multiplexor to select the first branch prediction to override a second branch prediction. The second branch prediction may be based on a global history. The LPT may have a plurality of LPT entries, each LPT entry including a plurality of pattern fields, each pattern field to store one of a plurality of patterns per branch instruction. Each pattern field may include a final prediction subfield in which to store the first branch prediction for the corresponding pattern. Each pattern field may also include an occurrence count subfield in which to store an occurrence count for the corresponding pattern. The top pattern flag may be based on the occurrence count and the misprediction rate. The first branch prediction may be provided by the LPT only if the corresponding top pattern flag is set. The processor may also include a first prediction decision circuit to determine whether the multiplexor is to select the first branch prediction, wherein the first prediction decision circuit is to determine based on the corresponding occurrence count and the corresponding misprediction rate. The processor may also include a second prediction decision circuit to set a local pattern flag in response to the multiplexor overriding the second branch prediction with the first branch prediction. The processor may also include a first post-prediction decision circuit to determine whether a branch prediction was accurate. The processor may also include a second post-prediction decision circuit to use the local pattern flag to determine whether an actual branch direction corresponds to the first branch prediction or the second branch prediction.

What is claimed is:

1. An apparatus comprising:
    a current pattern table (CPT) having a plurality of CPT entries, each CPT entry to store a CPT instruction pointer (IP) and a single current pattern for the corresponding CPT IP;
    a local pattern table (LPT) having a plurality of LPT entries, each LPT entry to store an LPT IP, a plurality of patterns, and a misprediction rate for each of the plurality of patterns, the LPT to provide a first branch prediction if the current pattern matches one of the plurality of patterns;
    a multiplexor to select the first branch prediction to override a second branch prediction; and
    a first prediction decision circuit to determine whether the multiplexor is to select the first branch prediction, wherein the first prediction decision circuit is to determine based on the corresponding misprediction rate;

wherein the CPT is distinct from and coupled to the LPT to determine whether the single current pattern in the CPT matches one of the plurality of patterns in the LPT.

2. The apparatus of claim 1, wherein the current pattern has a pattern length based, at least in part, on a counter.

3. The apparatus of claim 2, wherein the pattern length is also based, at least in part, on a termination condition.

4. The apparatus of claim 3, wherein the termination condition is a flip in direction of a corresponding branch instruction.

5. The apparatus of claim 4, wherein each CPT entry includes a flip flag to indicate a value for the termination condition.

6. The apparatus of claim 1, wherein the second branch prediction is based on a global history.

7. The apparatus of claim 6, each LPT entry including a plurality of pattern fields, each pattern field to store one of the plurality of patterns.

8. The apparatus of claim 7, wherein each pattern field includes a final prediction subfield in which to store the first branch prediction for the corresponding pattern.

9. The apparatus of claim 8, wherein each pattern field also includes an occurrence count subfield in which to store an occurrence count for the corresponding pattern.

10. The apparatus of claim 9, wherein each pattern field also includes a misprediction rate subfield in which to store the misprediction rate for the corresponding pattern.

11. The apparatus of claim 10, wherein each pattern field also includes a top pattern subfield in which to store a top pattern flag for the corresponding pattern.

12. The apparatus of claim 11, wherein the top pattern flag is based on the occurrence count and the misprediction rate.

13. The apparatus of claim 12, wherein the first branch prediction is provided by the LPT only if the corresponding top pattern flag is set.

14. The apparatus of claim 13, wherein the first prediction decision circuit is to determine based also on the corresponding occurrence count.

15. The apparatus of claim 14, further comprising a second prediction decision circuit to set a local pattern flag in response to the multiplexor overriding the second branch prediction with the first branch prediction.

16. The apparatus of claim 15, further comprising a first post-prediction decision circuit to determine whether a branch prediction was accurate.

17. The apparatus of claim 16, further comprising a second post-prediction decision circuit to use the local pattern flag to determine whether an actual branch direction corresponds to the first branch prediction or the second branch prediction.

18. A system comprising:
  a memory in which to store a plurality of instruction traces, each instruction trace including a plurality of branch instructions;
  a processor including a branch predictor, the branch predictor including:
  a current pattern table (CPT) having a plurality of CPT entries, each CPT entry to store a CPT instruction pointer (IP) and a single current pattern for the corresponding CPT IP;
  a local pattern table (LPT) having a plurality of LPT entries, each LPT entry to store an LPT IP, a plurality of patterns, and a misprediction rate for each of the plurality of patterns, the LPT to provide a first branch prediction if the current pattern matches one of the plurality of patterns;
  a multiplexor to select the first branch prediction to override a second branch prediction; and
  a first prediction decision circuit to determine whether the multiplexor is to select the first branch prediction, wherein the first prediction decision circuit is to determine based on the corresponding misprediction rate;
  wherein the CPT is distinct from and coupled to the LPT to determine whether the single current pattern in the CPT matches one of the plurality of patterns in the LPT.

* * * * *